United States Patent [19]

Deschler

[11] Patent Number: 5,009,001

[45] Date of Patent: Apr. 23, 1991

[54] METHOD OF INCREASING THE FATIGUE STRENGTH OF CRANKSHAFTS

[75] Inventor: Gerhard Deschler, Nuremberg, Fed. Rep. of Germany

[73] Assignee: MAN Nutzfahrzeuge Aktiengesellschaft, Munich, Fed. Rep. of Germany

[21] Appl. No.: 525,474

[22] Filed: May 18, 1990

[30] Foreign Application Priority Data

May 19, 1989 [DE] Fed. Rep. of Germany ....... 3916421

[51] Int. Cl.$^5$ .................................................. F16C 3/10
[52] U.S. Cl. ..................................... 29/888.08; 29/557
[58] Field of Search ............................. 29/888.08, 557; 74/594.1, 595

[56] References Cited

U.S. PATENT DOCUMENTS

| | | | |
|---|---|---|---|
| 2,285,772 | 6/1942 | Groene et al. | 29/888.08 |
| 3,704,636 | 12/1972 | Piech | 74/595 |
| 4,269,551 | 5/1981 | Kralowetz | 29/888.08 |
| 4,641,546 | 2/1987 | Mettler | 29/888.08 |

FOREIGN PATENT DOCUMENTS

| | | | |
|---|---|---|---|
| 0106641 | 6/1985 | Japan | 29/888.08 |
| 0109032 | 4/1989 | Japan | 29/888.08 |

Primary Examiner—Howard N. Goldberg
Assistant Examiner—I. Cuda
Attorney, Agent, or Firm—Robert W. Becker & Associates

[57] ABSTRACT

A method of increasing the fatigue strength of crankshafts for reciprocating engines, especially internal combustion engines, is provided. When converting naturally aspirating production engines to supercharging to increase the power, the fatigue strength of the crankshaft quickly reaches a limit. Since for reasons of economy it is desirable not to alter the geometry of the crackshaft and to avoid expensive fine burnishing to increase the quality of the surface, and hence the fatigue strength associated therewith, the transition radius from the crankshaft pin to the crank web is inductively surface hardened, and at the same time the finish quality of the surface is reduced. The increased costs for the hardening are balanced by the reduced surface machining that is required.

3 Claims, 1 Drawing Sheet

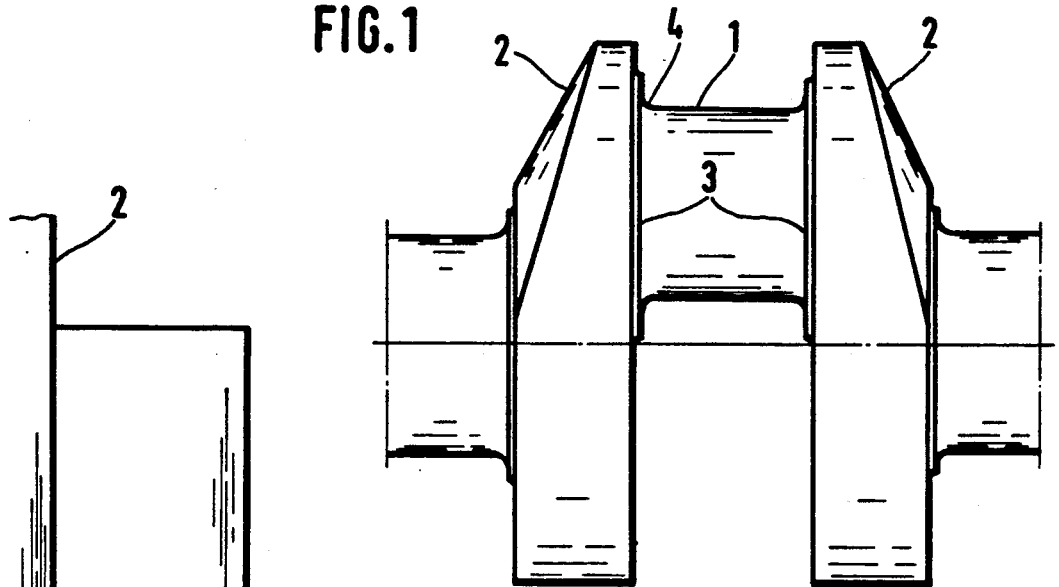
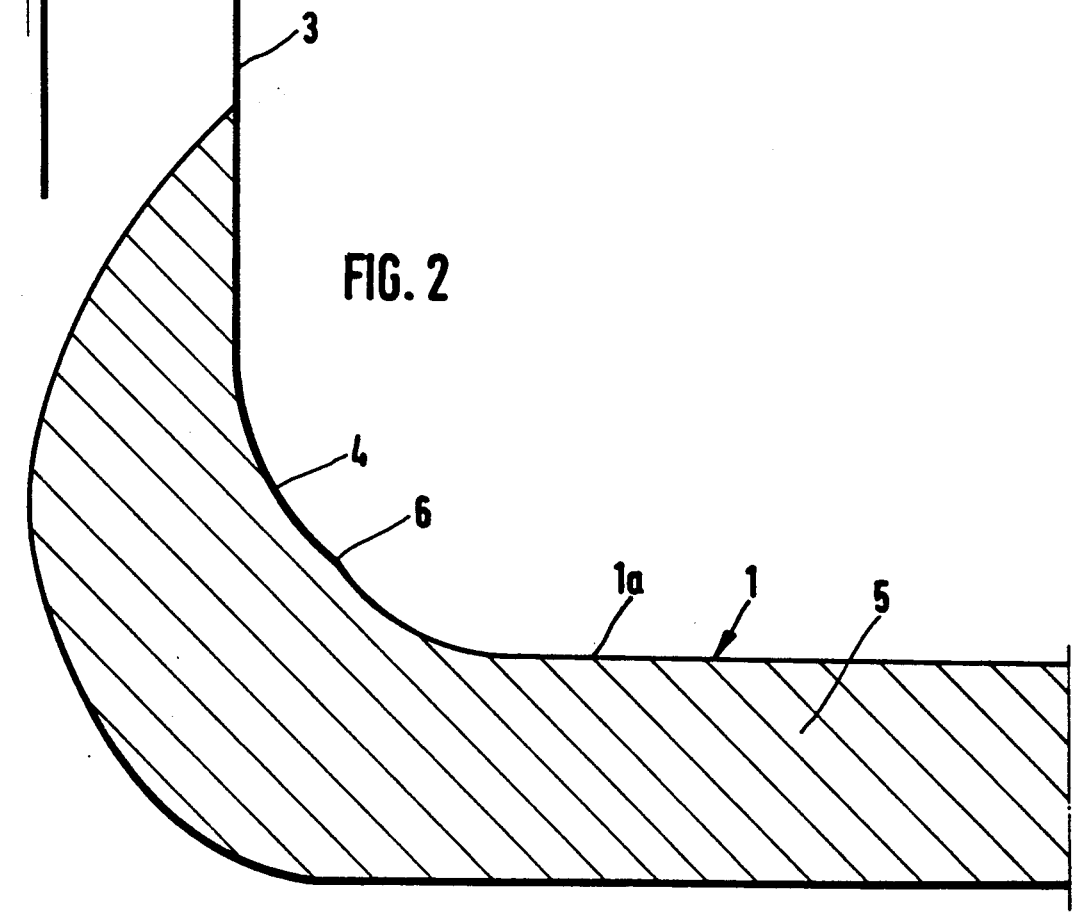

METHOD OF INCREASING THE FATIGUE STRENGTH OF CRANKSHAFTS

BACKGROUND OF THE INVENTION

The present invention relates to a method of increasing the fatigue strength of crankshafts for reciprocating engines, especially internal combustion engines, and includes the step of subjecting the transition radii from a crankshaft pin to adjacent crank webs to a special treatment.

Increasing the power of internal combustion engines is achieved via supercharging, which results in an increase of the mechanical forces in the overall piston drive. At the same time, in order to reduce costs for various engine models, it is desirable to avoid retooling and recalculation of components to the greatest extent possible.

For this purpose, it is attempted to increase the fatigue strength of components by improving the quality of the surface. Pursuant to known strength of material principles, the fatigue strength of a component can be increased by fine burnishing and polishing of the surface, and hence a reduction of the peak-to-valley height, i.e. the micro scoring. However, fine burnishing and polishing of the surface is relatively cost intensive.

It is therefore an object of the present invention to increase the fatigue strength of crankshafts in the region of the transition from the crankshaft pin to the crank web without altering the geometry and without expensive machining or finishing of the surface.

BRIEF DESCRIPTION OF THE DRAWING

This object, and objects and advantages of the present invention, will appear more clearly from the following specification in conjunction with the accompanying schematic drawing, in which:

FIG. 1 shows a portion of one exemplary embodiment of an inventively treated crankshaft; and FIG. 2 is an enlarged view of the transition region from a crankshaft pin to a crank web.

SUMMARY OF THE INVENTION

The method of the present invention is characterized primarily in that the treatment comprises a hardening in the region of the transition radii to a hardening zone depth of 2 to 3 mm, which accompanies a finishing of the surface, starting from a blend edge, between a bearing point and transition radius, and proceeding to the end of a butting collar, to a peak-to-valley height of greater than 6.3 $\mu$m.

By hardening the transition radii, the reduction of the fatigue strength as a result of the greater peak-to-valley height is overcompensated for, in other words, the fatigue strength increases more in the transition region from crankshaft pin to crank web due to the localized hardening than it decreases due to the greater peak-to-valley height resulting from the courser surface finishing. The hardening is a considerably more economical finishing process than is a fine burnishing and polishing of the surface to a peak-to-valley height of less than 6.3 $\mu$m.

By means of the inventive method, it is possible to increase the power of a given engine model, for example via supercharging, without having to geometrically alter the crankshaft, which always involves a high capital expenditure and a change-over of the machining tools. At the same time, it is not necessary to counteract the increase in tension that results in the crankshaft due to the increased stress of the piston drive by improving the quality of the surface beyond a feasible extent in order to reduce the influence of the micro scoring or notching effect. The inventive method is an excellent means for maintaining the geometry of the crankshaft without having to expend an excessive effort for finishing technique.

Pursuant to one advantageous specific embodiment of the inventive method, the peak-to-valley height is in the range of from 6.3 $\mu$m to 25 $\mu$m.

This surface quality can be produced within a feasible cost, so that the extra cost for the hardening, plus the cost for the now reduced surface quality, are considerably less than the cost for finishing the surface to a peak-to-valley height of less than 6.3 $\mu$m.

Pursuant to a further advantageous specific embodiment of the inventive method, it is proposed that the peak-to-valley height in the region of the transition radii and the butting collars be the same. Such a feature simplifies the finishing, since the transition radius and the butting collar can be machined in a single operation.

Further specific features of the present invention will be described in detail subsequently.

DESCRIPTION OF PREFERRED EMBODIMENTS

Referring now to the drawing in detail, FIG. 1 shows a portion of a crankshaft having a crankshaft pin 1, adjoining crank webs 2, and butting collars 3. The crankshaft pin 1 merges with an adjoining crank web 2 via a transition radius 4. As is the case with every transition from 1 diameter to another diameter, this transition radius 4 is characterized by a stress concentration. Since in the case of an increase in power of the engine, for example via supercharging, the fatigue strength of the crankshaft in this zone is rapidly exceeded, yet for cost reasons a redimensioning should be avoided if at all possible, a remedial action must be divised. For this purpose, pursuant to the heretofore known state of the art, the quality or finish of the surface of the transition radii is improved via fine burnishing and polishing to peak-to-valley heights of less than 6.3 $\mu$m, thereby reducing the micro-notch or scoring effect, so that the fatigue strength increases. However, experience has shown this to be an expensive measure.

In place of this known process, the inventive method proposes reducing the surface finish at the transition radius to peak-to-valley heights "RZ" of 6.3 $\mu$m all the way up to 25 $\mu$m, and as a compensation for this, subjecting the region of the transition radius 4 to a hardening process.

The depth of the hardening zone should be about 2 to 3 mm. Heating in the surface region can be conventionally effected in an inductive manner, and water is used to cool during tempering or quenching.

An enlarged view of the transition radius 4 is illustrated in FIG. 2. The transition radius 4 begins at a blend edge 6 between a bearing point 1a of the crankshaft pin 1 and the transition to the butting collar 3. This transition radius 4 from the crankshaft pin 1 to the butting collar 3 of the crank web 2 is indictively hardened to a depth of 2 to 3 mm. The peak-to-valley height is 6.3 $\mu$m up to 25 $\mu$m, and therefore does not require a particularly expensive surface treatment. Merely the bearing point 1a is finished to a peak-to-valley height of less than 6.3 $\mu$m in order to ensure the bearing function. Of particular advantage for the finishing is the fact that the same peak-to-valley height can be provided for the transition radius and the butting collar, so that the finishing of both components can be effected in a single operation. The harding zone 5, with a depth of 2 to 3 mm, is shown with cross hatching.

The present invention is, of course, in no way restricted to the specific disclosure of the specification and drawing, but also encompasses any modifications within the scope of the appended claims.

What I claim is:

1. In a method of increasing the fatigue strength of crankshafts for reciprocating engines, especially internal combustion engines, including the step of subjecting the transition radii from a crankshaft pin to adjacent crank webs to a special treatment, the improvement comprising the steps of:

finishing the surface, starting from a blend edge, between a bearing point and transition radius, and proceeding to the end of a butting collar, to a peak-to-valley height of greater than 6.3 $\mu$m; and effecting hardening in the region of said transition radii to a hardening zone depth of 2 to 3 mm.

2. A method according to claim 1, in which said peak-to-valley height of said finishing step is in the range of from 6.3 $\mu$m to 25 $\mu$m.

3. A method according to claim 2, which includes finishing the surface in the region of said transition radii and said butting collars to the same peak-to-valley heights.

* * * * *